(12) United States Patent
Lair

(10) Patent No.: US 8,015,797 B2
(45) Date of Patent: Sep. 13, 2011

(54) THRUST REVERSER NOZZLE FOR A TURBOFAN GAS TURBINE ENGINE

(76) Inventor: Jean-Pierre Lair, San Antonio, TX (US)

( * ) Notice: Subject to any disclaimer, the term of this patent is extended or adjusted under 35 U.S.C. 154(b) by 1215 days.

(21) Appl. No.: 11/534,202

(22) Filed: Sep. 21, 2006

(65) Prior Publication Data

US 2008/0072570 A1     Mar. 27, 2008

(51) Int. Cl.
F02K 3/02 (2006.01)
F02K 1/54 (2006.01)

(52) U.S. Cl. .................................. 60/226.2; 244/110 B

(58) Field of Classification Search .................. 60/226.2, 60/230, 226.1, 226.3, 262, 770; 239/265.25, 239/265.19, 265.11; 244/110 B See application file for complete search history.

(56) References Cited

U.S. PATENT DOCUMENTS

| | | |
|---|---|---|
| 2,847,823 A | 8/1958 | Brewer |
| 3,347,578 A | 10/1967 | Sheehan et al. |
| 3,492,821 A | 2/1970 | Monaghan et al. |
| 3,541,794 A | 11/1970 | Johnston et al. |
| 3,550,855 A | 12/1970 | Feld et al. |
| 3,610,534 A | 10/1971 | Medawar |
| 3,640,468 A | 2/1972 | Searle et al. |
| 3,660,982 A | 5/1972 | Gozlan |
| 3,684,182 A | 8/1972 | Maison |
| 3,856,239 A | 12/1974 | Leibach |
| 4,047,381 A | 9/1977 | Smith |
| 4,129,269 A | 12/1978 | Fage |
| 4,175,385 A | 11/1979 | Nash |
| 4,182,501 A | 1/1980 | Fage |
| 4,212,442 A | 7/1980 | Fage |
| 4,232,516 A | 11/1980 | Lewis et al. |
| 4,292,803 A | 10/1981 | Prior |
| 4,362,015 A | 12/1982 | Fage |
| 4,422,605 A | 12/1983 | Fage |
| 4,424,669 A | 1/1984 | Fage |
| 4,519,561 A | 5/1985 | Timms |
| 4,581,890 A | 4/1986 | Giraud |
| 4,682,733 A | 7/1987 | Newton |
| 4,801,112 A | 1/1989 | Fournier |
| 4,830,519 A | 5/1989 | Starke |
| 4,836,451 A | 6/1989 | Herrick et al. |
| 4,860,956 A | 8/1989 | Fage |
| 4,865,256 A | 9/1989 | Durand |
| 4,894,985 A | 1/1990 | Dubois |
| 4,909,346 A | 3/1990 | Torkelson |

(Continued)

FOREIGN PATENT DOCUMENTS

FR      2601077      1/1988

(Continued)

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

*Primary Examiner* — Michael Cuff
*Assistant Examiner* — Young Choi
(74) *Attorney, Agent, or Firm* — Francis L. Conte

(57) ABSTRACT

The thrust reverser comprises a first reverser door and a second reverser door asymmetrically pivotable between a stowed position and a deployed position, one having a pivot axis closer to the central axis than the other.

48 Claims, 11 Drawing Sheets

U.S. PATENT DOCUMENTS

| | | | |
|---|---|---|---|
| 4,914,905 A | 4/1990 | Dubois | |
| 4,916,895 A | 4/1990 | Dubois | |
| 4,922,712 A | 5/1990 | Matta | |
| 4,922,713 A | 5/1990 | Barbarin | |
| 4,960,243 A | 10/1990 | Dubois | |
| 4,966,327 A | 10/1990 | Fage et al. | |
| 4,976,466 A | 12/1990 | Vauchel | |
| 4,998,409 A | 3/1991 | Mutch | |
| 5,003,770 A | 4/1991 | Schegerin | |
| 5,039,171 A | 8/1991 | Lore | |
| 5,040,730 A | 8/1991 | Hogie | |
| 5,083,426 A | 1/1992 | Layland | |
| 5,090,197 A | 2/1992 | Dubois | |
| 5,097,661 A | 3/1992 | Lair et al. | |
| 5,101,621 A | 4/1992 | Mutch | |
| 5,117,630 A | 6/1992 | Cariola | |
| 5,120,004 A | 6/1992 | Matthias | |
| 5,167,118 A | 12/1992 | Torkelson | |
| 5,176,340 A | 1/1993 | Lair | |
| 5,181,676 A | 1/1993 | Lair | |
| 5,192,023 A | 3/1993 | Fage et al. | |
| 5,197,693 A | 3/1993 | Remlaoui | |
| 5,203,525 A | 4/1993 | Remlaoui | |
| 5,209,057 A | 5/1993 | Remlaoui | |
| 5,211,008 A | 5/1993 | Fage | |
| 5,221,048 A | 6/1993 | Lair | |
| 5,224,342 A | 7/1993 | Lair | |
| 5,228,641 A | 7/1993 | Remlaoui | |
| 5,230,213 A | 7/1993 | Lawson | |
| 5,243,817 A | 9/1993 | Matthias | |
| 5,251,453 A | 10/1993 | Pauley | |
| 5,267,438 A | 12/1993 | Bunel | |
| 5,284,015 A | 2/1994 | Carimali | |
| 5,297,387 A | 3/1994 | Carimali | |
| 5,309,711 A | 5/1994 | Matthias | |
| 5,310,117 A | 5/1994 | Fage et al. | |
| 5,347,808 A | 9/1994 | Standish | |
| 5,372,006 A | 12/1994 | Lair | |
| 5,390,879 A | 2/1995 | Lair | |
| 5,392,991 A | 2/1995 | Gatti | |
| 5,396,762 A | 3/1995 | Standish | |
| 5,419,515 A | 5/1995 | Lair | |
| 5,440,875 A | 8/1995 | Torkelson | |
| 5,473,886 A | 12/1995 | Lebrun | |
| 5,524,431 A | 6/1996 | Brusson | |
| 5,548,954 A | 8/1996 | de Cambray | |
| 5,558,594 A | 9/1996 | Lefranc | |
| 5,592,813 A * | 1/1997 | Webb | 60/226.2 |
| 5,615,549 A | 4/1997 | Valleroy | |
| 5,615,834 A | 4/1997 | Osman | |
| 5,655,360 A | 8/1997 | Butler | |
| 5,666,802 A | 9/1997 | Lair | |
| 5,671,598 A | 9/1997 | Standish | |
| 5,716,025 A | 2/1998 | Meyer | |
| 5,720,449 A | 2/1998 | Laboure | |
| 5,725,182 A | 3/1998 | Valleroy | |
| 5,727,380 A | 3/1998 | Lardy et al. | |
| 5,730,392 A | 3/1998 | Lair | |
| 5,765,362 A | 6/1998 | Gonidec | |
| 5,775,097 A | 7/1998 | Lardy | |
| 5,775,639 A | 7/1998 | Fage | |
| 5,778,659 A | 7/1998 | Duesler | |
| 5,778,660 A | 7/1998 | Jean | |
| 5,779,192 A * | 7/1998 | Metezeau et al. | 244/110 B |
| 5,782,434 A | 7/1998 | Jean | |
| 5,785,249 A | 7/1998 | Metezeau | |
| 5,794,433 A * | 8/1998 | Peters et al. | 60/226.2 |
| 5,799,903 A | 9/1998 | Vauchel | |
| 5,806,302 A | 9/1998 | Cariola | |
| 5,813,220 A | 9/1998 | Portal | |
| 5,819,527 A | 10/1998 | Fournier | |
| 5,819,528 A | 10/1998 | Masson | |
| 5,826,823 A | 10/1998 | Lymons | |
| 5,836,149 A * | 11/1998 | Servanty | 60/226.2 |
| 5,852,928 A | 12/1998 | Vauchel | |
| 5,853,148 A | 12/1998 | Standish | |
| 5,863,014 A | 1/1999 | Standish | |
| 5,875,995 A | 3/1999 | Moe | |
| 5,893,265 A | 4/1999 | Gonidec | |
| 5,899,059 A | 5/1999 | Gonidec | |
| 5,904,041 A | 5/1999 | Dhainault | |
| 5,913,476 A | 6/1999 | Gonidec | |
| 5,927,647 A | 7/1999 | Masters | |
| 5,930,991 A | 8/1999 | Fournier | |
| 5,934,613 A | 8/1999 | Standish | |
| 5,937,636 A | 8/1999 | Gonidec | |
| 5,947,625 A | 9/1999 | Vauchel | |
| 5,956,939 A | 9/1999 | Fage | |
| 5,960,626 A | 10/1999 | Baudu | |
| 5,967,460 A | 10/1999 | Baudu | |
| 5,970,704 A | 10/1999 | Lardy | |
| 5,974,783 A | 11/1999 | Gonidec | |
| 5,983,625 A | 11/1999 | Gonidec | |
| 5,987,881 A | 11/1999 | Gonidec | |
| 5,996,937 A | 12/1999 | Gonidec | |
| 5,997,054 A | 12/1999 | Baudu | |
| 6,000,216 A | 12/1999 | Vauchel | |
| 6,009,702 A | 1/2000 | Gonidec | |
| 6,026,638 A | 2/2000 | Gonidec | |
| 6,027,071 A | 2/2000 | Lair | |
| 6,029,439 A | 2/2000 | Gonidec | |
| 6,032,901 A | 3/2000 | Carimali | |
| 6,044,641 A | 4/2000 | Baudu | |
| 6,045,091 A | 4/2000 | Baudu | |
| 6,065,285 A | 5/2000 | Gonidec | |
| 6,068,213 A | 5/2000 | Gonidec | |
| 6,076,347 A | 6/2000 | Gonidec | |
| 6,079,201 A | 6/2000 | Jean | |
| 6,082,096 A | 7/2000 | Vauchel | |
| 6,094,908 A | 8/2000 | Baudu | |
| 6,101,807 A | 8/2000 | Gonidec | |
| 6,105,439 A | 8/2000 | Roger | |
| 6,145,301 A | 11/2000 | Gonidec | |
| 6,145,786 A | 11/2000 | Baudu | |
| 6,148,607 A | 11/2000 | Baudu | |
| 6,151,884 A | 11/2000 | Gonidec | |
| 6,151,885 A | 11/2000 | Metezeau | |
| 6,151,886 A | 11/2000 | Vauchel | |
| 6,158,211 A | 12/2000 | Gonidec | |
| 6,170,254 B1 | 1/2001 | Cariola | |
| 6,170,255 B1 | 1/2001 | Gonidec | |
| 6,173,807 B1 | 1/2001 | Welch et al. | |
| 6,216,980 B1 | 4/2001 | Baudu | |
| 6,237,325 B1 | 5/2001 | Hogie | |
| 6,256,979 B1 | 7/2001 | Fournier | |
| 6,260,801 B1 | 7/2001 | Peters | |
| 6,276,026 B1 | 8/2001 | Wille | |
| 6,289,670 B1 * | 9/2001 | Charier et al. | 60/230 |
| 6,293,495 B1 | 9/2001 | Aten | |
| 6,311,828 B1 * | 11/2001 | Newnes et al. | 198/456 |
| 6,311,928 B1 * | 11/2001 | Presz et al. | 244/110 B |
| 6,357,672 B1 | 3/2002 | Cowan et al. | |
| 6,385,964 B2 | 5/2002 | Jean | |
| 6,402,092 B1 | 6/2002 | Jean | |
| 6,438,942 B2 | 8/2002 | Fournier | |
| 6,487,845 B1 | 12/2002 | Modglin | |
| 6,546,715 B1 | 4/2003 | Blevins | |
| 6,546,716 B2 | 4/2003 | Lair | |
| 6,568,172 B2 | 5/2003 | Jannetta et al. | |
| 6,584,763 B2 | 7/2003 | Lymons | |
| 6,592,074 B2 | 7/2003 | Dehu | |
| 6,622,964 B2 | 9/2003 | Rouyer | |
| 6,688,098 B2 | 2/2004 | Rouyer | |
| 6,688,099 B2 | 2/2004 | Lair | |
| 6,751,944 B2 | 6/2004 | Lair | |
| 6,786,038 B2 | 9/2004 | Lair | |
| 6,804,947 B2 | 10/2004 | Le Docte | |
| 6,820,410 B2 | 11/2004 | Lair | |
| 6,845,607 B2 | 1/2005 | Lair | |
| 6,845,945 B1 * | 1/2005 | Smith | 244/110 B |
| 6,845,946 B1 | 1/2005 | Lair | |
| 6,895,742 B2 | 5/2005 | Lair et al. | |
| 6,910,328 B1 | 6/2005 | Joyce | |
| 6,926,234 B2 | 8/2005 | Colotte | |
| 6,938,408 B2 | 9/2005 | Lair | |
| 6,945,031 B2 | 9/2005 | Lair | |
| 6,966,175 B2 | 11/2005 | Lair | |

| | | |
|---|---|---|
| 6,968,675 B2 | 11/2005 | Ramlaoui et al. |
| 6,971,229 B2 | 12/2005 | Lair |
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,104,500 B1 * | 9/2006 | Smith ............ 244/110 B |
| 7,127,880 B2 | 10/2006 | Lair |
| 7,146,796 B2 | 12/2006 | Lair |
| 7,255,307 B2 | 8/2007 | Mayes |
| RE39,972 E | 1/2008 | Royalty |
| 2004/0139726 A1 | 7/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0045732 A1 | 3/2006 | Durocher et al. |
| 2006/0288688 A1 | 12/2006 | Lair |

FOREIGN PATENT DOCUMENTS

WO       86/00862 A1       2/1986

OTHER PUBLICATIONS

U.S. Appl. No. 11/941,360, filed Nov. 16, 2007, entitled "Thrust Reverser Door", by Jean-Pierre Lair.

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

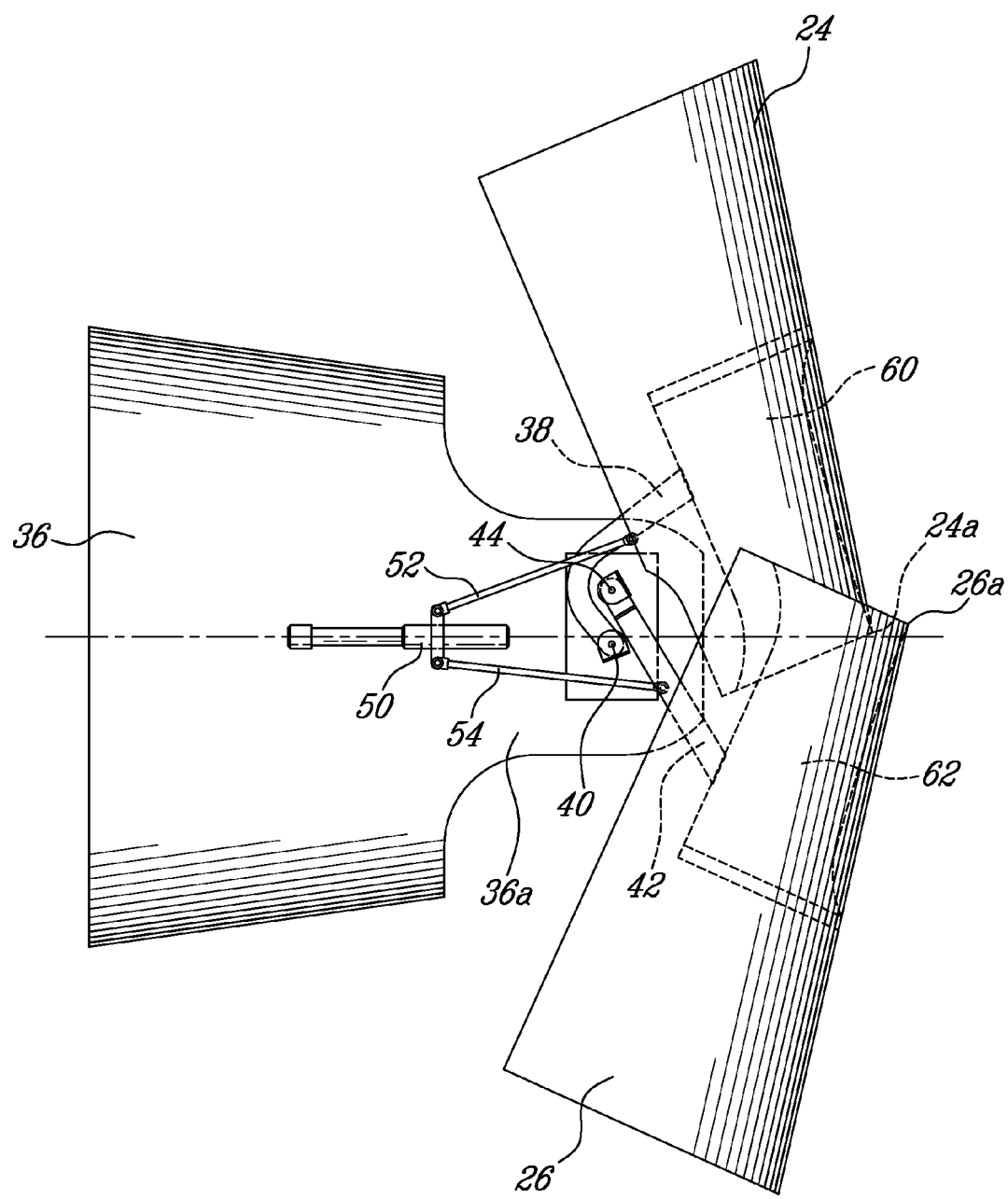

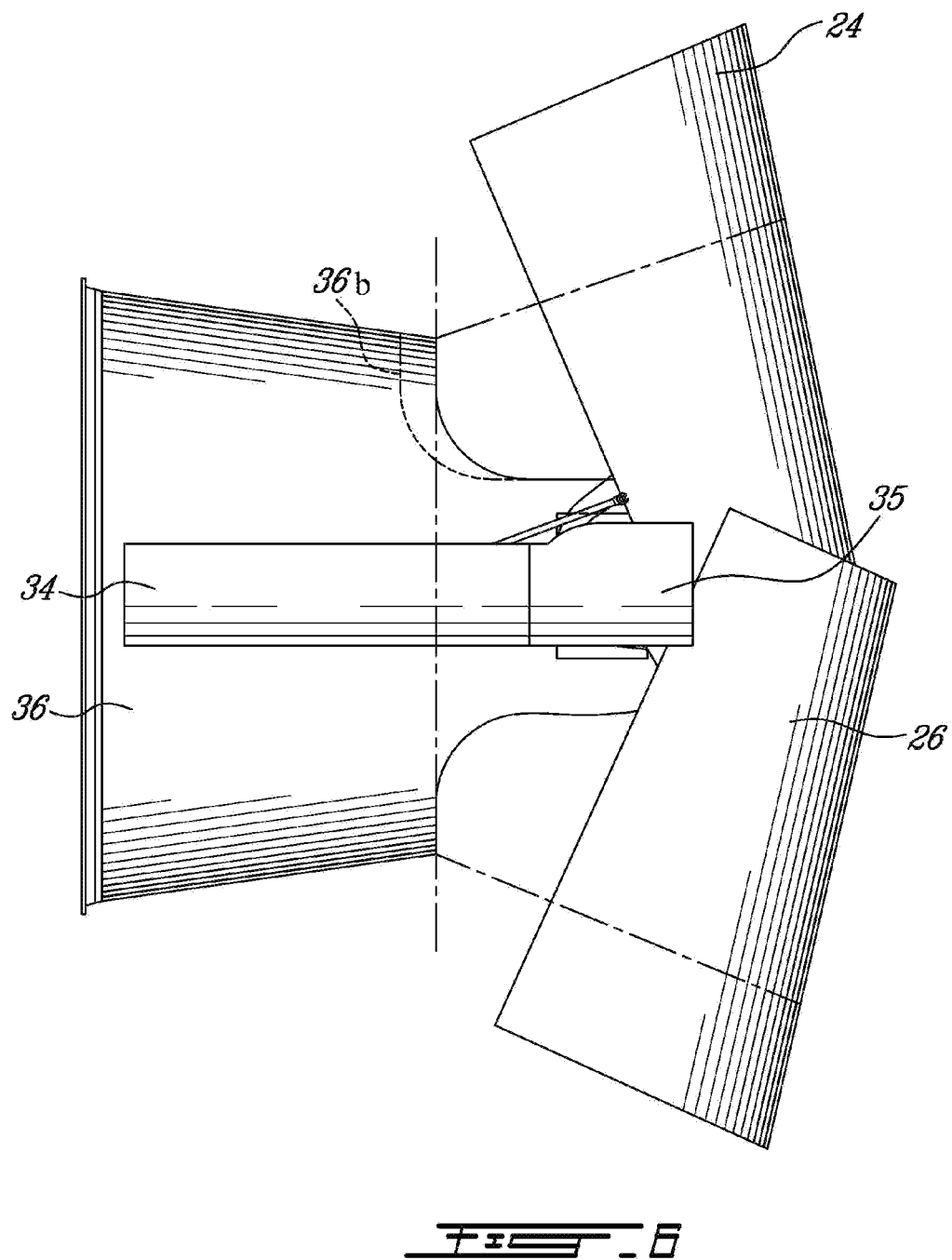

THRUST REVERSER NOZZLE FOR A TURBOFAN GAS TURBINE ENGINE

TECHNICAL FIELD

The invention relates to a thrust reverser nozzle, and in particular to a thrust reverser nozzle for a turbofan gas turbine engine. It also relates to a method of providing aerodynamic braking of an aircraft.

BACKGROUND

It is generally desired to assist wheel braking using aerodynamic decelerating means on aircrafts equipped with gas turbine engines because of the high landing speeds of these aircrafts. The aerodynamic decelerating means are especially useful on wet or icy runways to enhance the stopping capability of aircrafts.

A thrust reverser nozzle is one example of aerodynamic decelerating means used on aircrafts with one or more turbofan gas turbine engines. A thrust reverser nozzle deflects at least a portion of the air from the gas turbine engine to create a braking force slowing down the aircraft. The deflected air can come from the by-pass flow or from both the by-pass flow and the core flow.

Overall, although existing designs of thrust reverser nozzles are generally satisfactory when they are in the deployed position, it is still desirable to further improve the design of the stowed configuration of the thrust reverser nozzles for turbofan gas turbine engines, so that the engine's forward thrust performance is not affected by the presence of the thrust reverser nozzles.

SUMMARY

In one aspect, the present concept provides a thrust reverser nozzle for a nacelle of a turbofan gas turbine engine, the nacelle having a central axis and a propulsive jet outlet, the thrust reverser nozzle comprising a first reverser door and a second reverser door defining a portion of an aft section of the nacelle, the doors having a respective trailing edge adjacent to the propulsive jet outlet and being asymmetrically pivotable between a stowed position and a deployed position, one of the doors having a pivot axis closer to the central axis of the nacelle than the other door.

In another aspect, the present concept provides a thrust reverser for a turbofan engine having a central axis of rotation and an exhaust nozzle, the thrust reverser comprising first and second deflectors pivotally attached to the engine such that the first deflector pivots about a single non-translating first pivot axis and the second deflector pivots about a single non-translating second pivot axis, the first and second pivot axes extending generally transverse to the central axis, the first and second deflectors pivoting between respective stowed and deflecting positions, the first and second pivot axes being asymmetrically radially spaced relative to the central axis.

In another aspect, the present concept provides a thrust reverser for a turbofan engine having a central axis of rotation, the thrust reverser comprising at least first and second deflectors having respective pivot axes, the pivot axes disposed at different radial distances from the central axis.

In another aspect, the present concept provides a method of providing aerodynamic braking of an aircraft using a turbofan gas turbine engine mounted in a nacelle, the nacelle generally defining a central axis, the method comprising: operating the engine; operating at least one actuator to pivot, from a stowed position to a deployed position, a first and a second door provided at a rear section of the nacelle, the first door pivoting around a first rotation axis and the second door pivoting around a second rotation axis, one among the first rotation axis and the second rotation axis being closer than the other to the central axis; and then increasing output thrust generated by the engine with the doors in their deployed position.

Further details of these and other aspects of the improved thrust reverser nozzle will be apparent from the detailed description and figures included below.

BRIEF DESCRIPTION OF THE FIGURES

For a better understanding and to show more clearly how it may be carried into effect, reference will now be made by way of example to the accompanying figures, in which:

FIG. 5 is a view similar to FIG. 4, with the doors in the deployed position;

FIG. 6 is a view similar to FIG. 5, showing the thrust reverser nozzle with the fairings;

DETAILED DESCRIPTION

Figure 1:
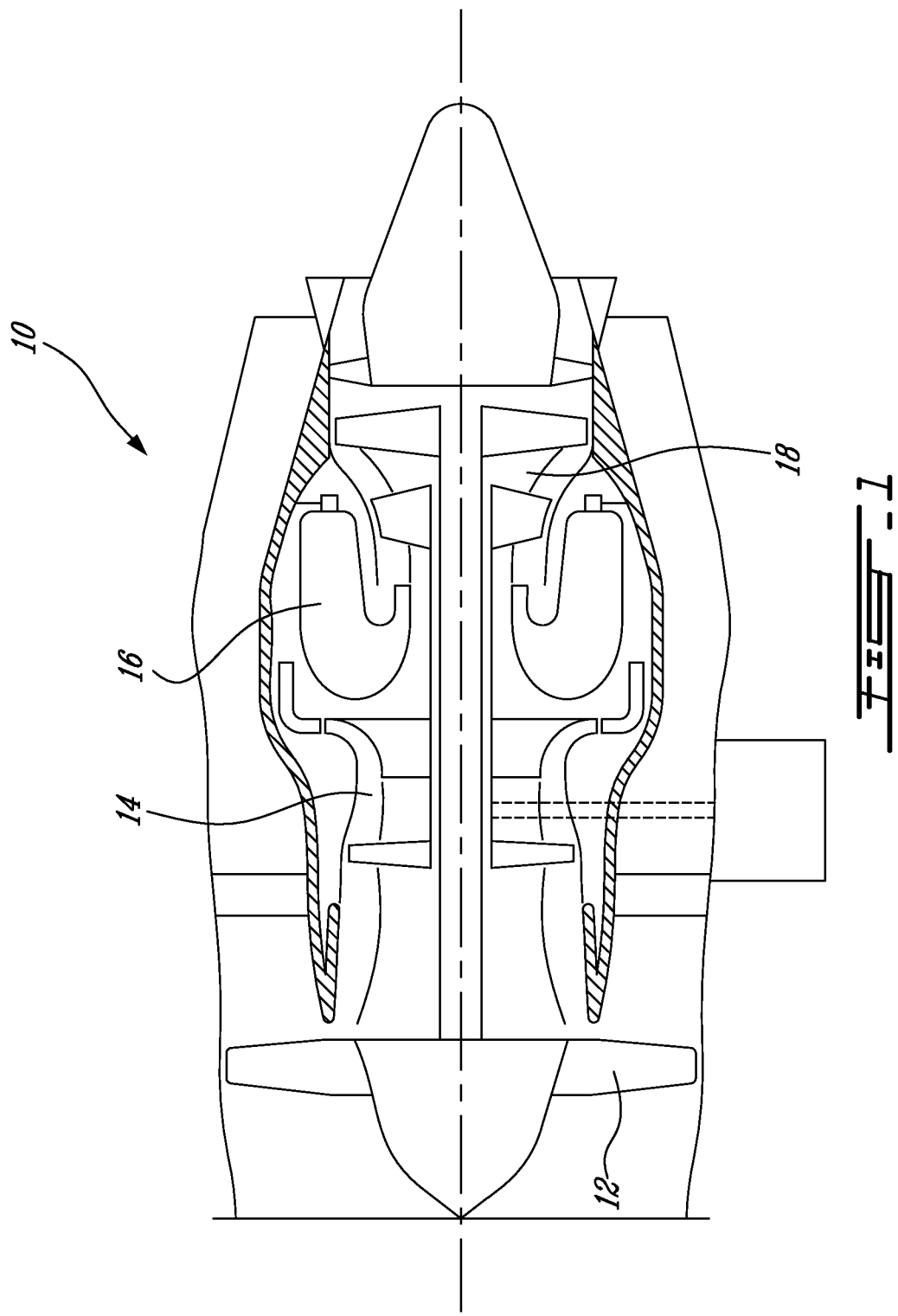
FIG. 1 schematically shows a generic turbofan gas turbine engine to illustrate an example of a general environment around which the improved thrust reverser nozzle can be used.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 only shows one example of the engine with which the improved thrust reverser nozzle can be used. The improved thrust reverser nozzle can also be used with other turbofan models.

Figure 2:
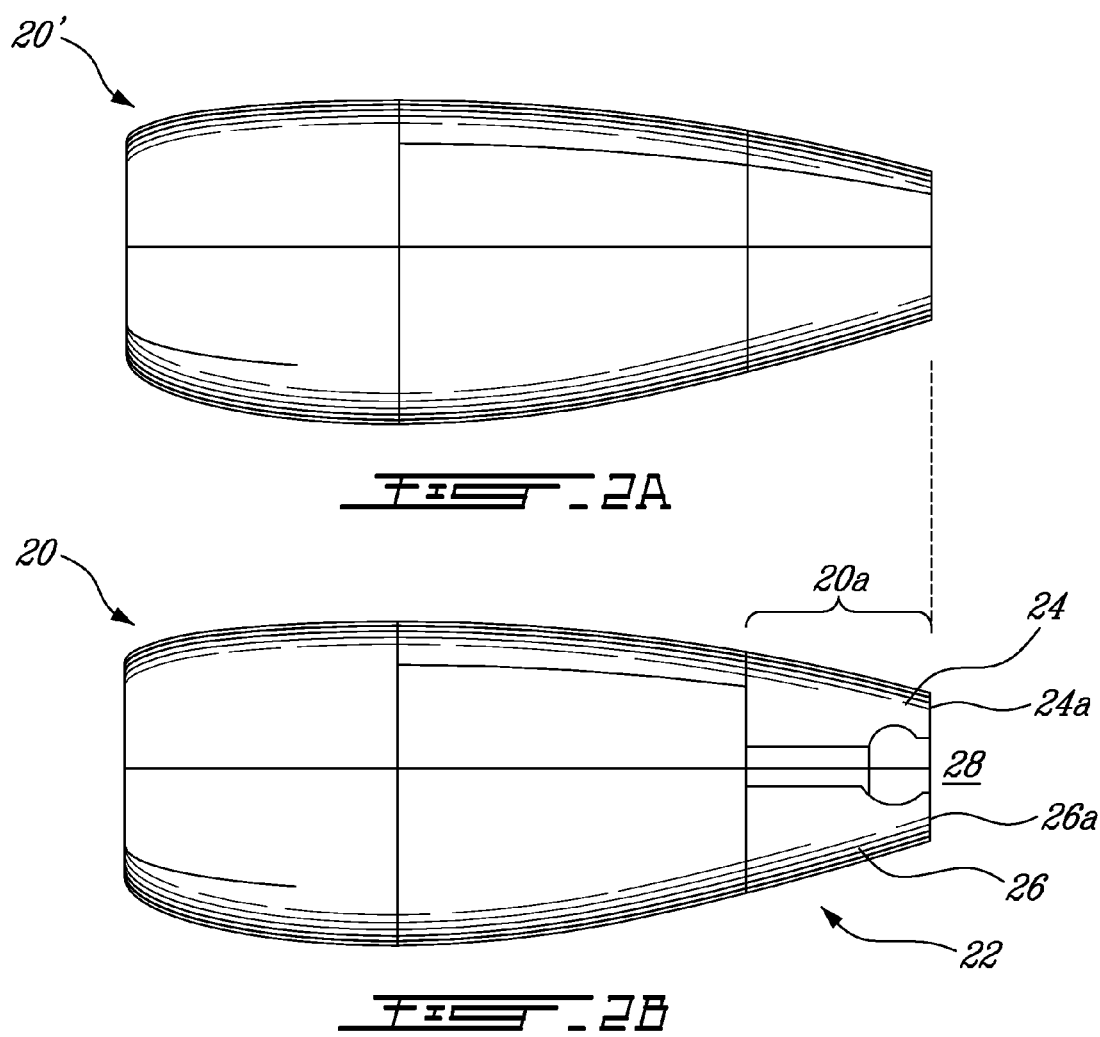
FIG. 2A is a side view of an example of a nacelle without a thrust reverser nozzle.
FIG. 2B is a side view of an example of a nacelle with the improved thrust reverser nozzle in a direct thrust position.

Referring now to FIG. 2A, there is shown an example of a nacelle 20' without a thrust reverser nozzle. The turbofan gas turbine engine is located within the nacelle and the nacelle is attached under the wings or on the fuselage of the aircraft using an appropriate arrangement (not shown).

FIG. 2B shows an example of a nacelle 20 with the improved thrust reverser nozzle 22. Ideally, the thrust reverser nozzle 22 is integrated within the outer and inner dimensions of the original nacelle so that the direct thrust performance of the engine is not affected. This way, the following key parameters of the nacelle exhaust, i.e., the mixing length, throat location, exit shape of the exhaust, inner and outer flow contour, base area, etc. are the same as the nacelle 20' of FIG. 2A. This ensures that the performance of the engine will be the same in the direct thrust mode of operation when using the nacelle 20 instead of the original nacelle 20'.

The thrust reverser nozzle 22 is provided in the aft section 20a of the nacelle 20. It comprises an upper reverser door 24 and a bottom reverser door 26. Both form a portion of the aft section 20a of the nacelle 20. Each door 24, 26 has a trailing edge 24a, 26a adjacent to the propulsive jet outlet 28. When the doors 24, 26 are in the stowed position, their respective trailing edges 24a, 26a lay in a common vertical plane. Also, the trailing edges 24a, 26a cooperate with the trailing edge of jet pipe arms to form a planar exit that is the outlet 28 of the propulsive jet.

It should be noted that although the doors are described in the detailed description and shown in the drawings as being an upper reverser door and a bottom reverser door movable in a vertical plane, the doors can also be configured as a left door and right door movable in a horizontal plane.

Figure 3:
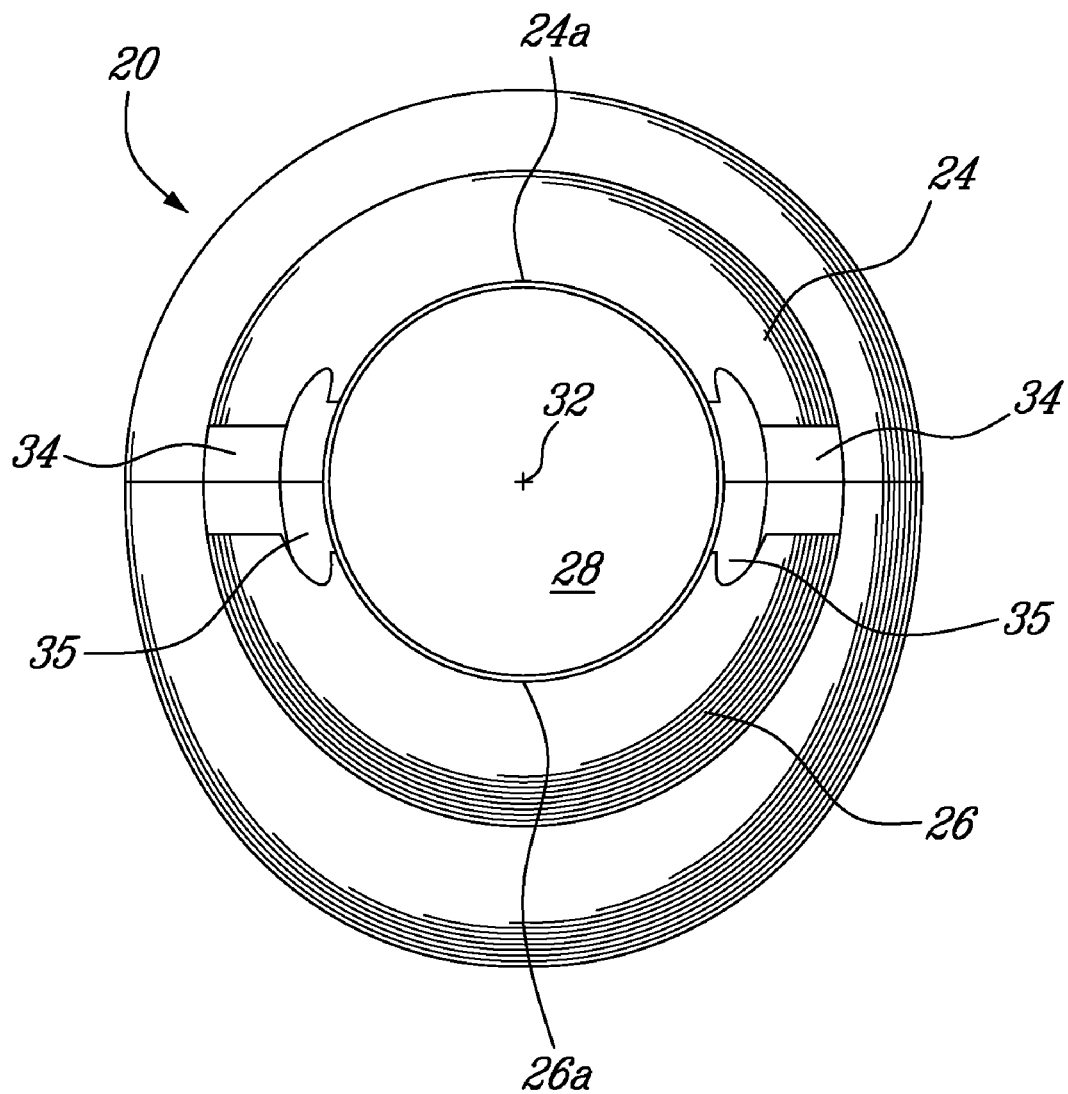
FIG. 3 is a rear view of the nacelle shown in FIG. 2B.

FIG. 3 is a rear view of the nacelle 20 shown in FIG. 2B. This view shows the upper reverser door 24 and the bottom reverser door 26 in their stowed position. The trailing edges 24a, 26a of both doors 24, 26 partially define the exhaust nozzle. The exhaust nozzle is concentric with a central axis 32 of the nacelle 20. The doors 24, 26 are separated on each side by a fairing 34 which covers a part of a door linkage system. Each fairing 34 includes a hinged flap 35 that is described hereafter.

Figure 4:
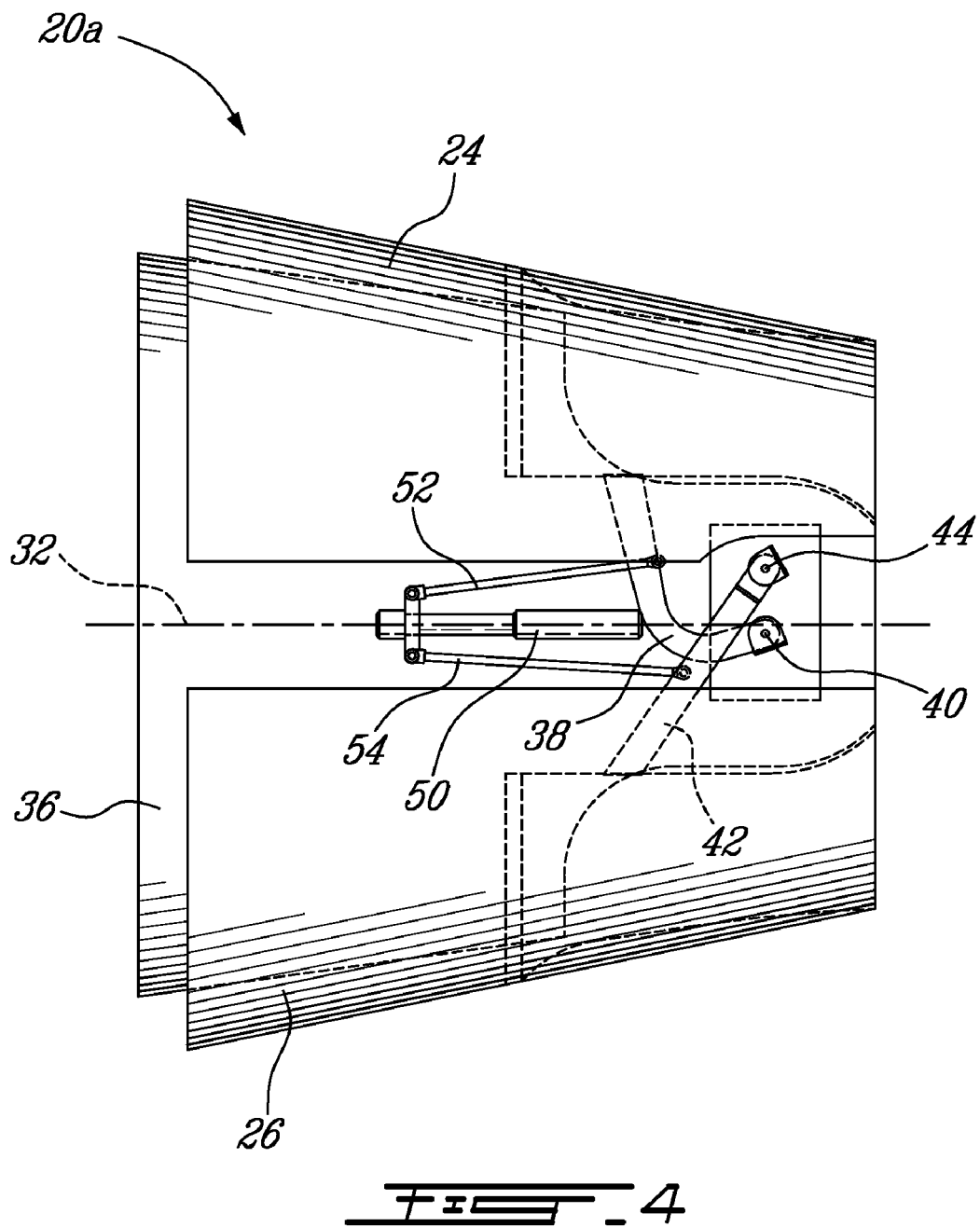
FIG. 4 is a side view showing the interior of the aft section of the nacelle with the thrust reverser nozzle of FIG. 2B.

Referring now to FIG. 4, there is shown the interior of the aft section 20a of the nacelle 20. This figure shows the linkage system for moving the doors 24, 26 from their stowed position to a deployed position, and vice-versa. The doors 24, 26 are connected, on each side, to a fixed structure around which a linking arm pivots. The fixed structure is hereby referred to as the jet pipe 36. The upper door 24 has a curved or L-shaped linking arm 38 pivoting around a substantially horizontal pivot axis 40 located slightly below the central axis 32. FIG. 4 further illustrates the bottom door 26 being connected to a substantially straight linking arm 42 pivoting around a substantially horizontal pivot axis 44 located above the center axis 32. It should be noted that the linking arms 42 of the bottom door 26 can also be L-shaped or have any other shape, in accordance with the design requirements. The arms of both doors 24, 26 are connected to their respective door at a point that is upstream their pivot axis 40, 44. This is advantageous in terms of rigidity since the outer diameter of the doors 24, 26 is larger in the upstream direction. Both arms are also curved to follow and fit in the space defined by the inner and outer contours of the thrust reverser nozzle 22. The arms 42 on both sides of the bottom door 26 are laterally offset with reference to the arms 38 of the upper door 24 so as to prevent them from colliding.

Each side of the thrust reverser nozzle 22 comprises a linear actuator 50 located between the two doors 24, 26 and in substantially a horizontal plane that contains the center axis 32. Each actuator 50 has two links 52, 54, one being connected to the upper reverser door 24 and the other to the bottom reverser door 26. The linkage of the actuator 50 is asymmetrically connected to the doors 24, 26, as further explained hereafter.

FIG. 5 shows the trust reverser nozzle 22 of FIG. 4 with the doors 24, 26 in their deployed position. As can be appreciated, the doors 24, 26 are asymmetrically pivoted form their stowed position to their deployed position. In the illustrated embodiment, the trailing edge 24a of the upper door 24 pivots into the bottom door 26. The doors 24, 26 are pivoted up to an angle where the propulsive jet coming out of the engine is deflected by the doors 24, 26 and can generate a force which axial component provides the retarding force to the aircraft. Therefore, once the doors 24, 26 are in their deployed position, increasing the output thrust generated by the engine creates an aerodynamic decelerating force.

As aforesaid, the linkage of the actuator 50 is asymmetrically connected to the doors 24, 26. The door with the shortest hinge arm has the shortest link.

The jet pipe 36 comprises two side arms 36a extending towards their rear. The doors 24, 26 are designed with complementary jet pipe portions 60, 62 attached to the reverser doors inner skin. The complementary jet pipe portions 60, 62 fit into a corresponding recess on the jet pipe 36 to obtain substantially a complete jet pipe when the doors 24, 26 are in their stowed position. This way, when the doors 24, 26 are in their stowed position, the jet pipe 36 can be almost identical to the jet pipe within a nacelle that is not provided with the thrust reverser nozzle, such as the nacelle 20' of FIG. 2A.

If desired, it is possible to have one complementary jet pipe portion longer than the other. For instance, the complementary jet pipe portion 60, or reverser door inner skin under the upper reverser door 24 can be longer to compensate the fact that the door 24 is closer to the jet pipe 36 when set in the deployed position. The corresponding recess of the jet pipe 36 will then be modified accordingly, such as the extended recess 36b shown in stippled lines in FIG. 6. This participates in ensuring a good compatibility between the engine and the thrust reverser nozzle by controlling the spacing ratio, i.e., the distance between the door and the recess of the jet pipe 36. The increased distance between the door and the exit plane of the jet pipe 36 will help maintaining the engine surge margin when the reverser nozzle 22 is deployed.

FIG. 6 is a view similar to FIG. 5, showing the fairing 34 and the hinged flap 35. The aft of the hinged flap 35 is outwardly pivoted when the doors 24, 26 move from their stowed position to their deployed position. The flap 35 moves outwards so as to make room to the longitudinal edge of the doors 24, 26. The flaps 35 are biased towards the interior by a spring, for instance a leaf spring, but are pushed toward the outside when the doors 24, 26 are rotated.

Figure 7A:
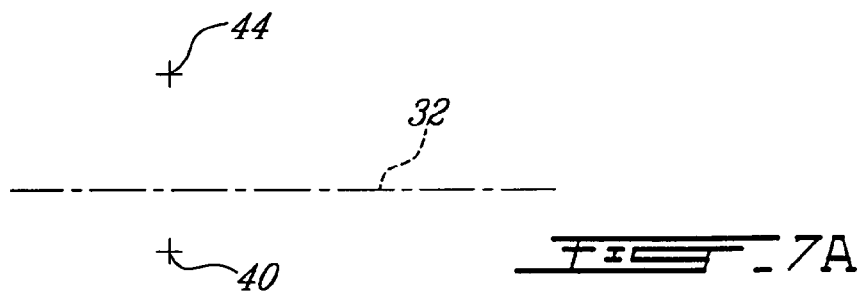
FIGS. 7A to 7E schematically show various configurations of the pivot axes with reference to the central axis of the nacelle.

FIGS. 7A to 7E show different embodiments for the relative position of the pivot axes with reference to the central axis of the nacelle 20. In all embodiments, one of the doors has a pivot axis closer to the central axis 32 of the nacelle 20 than the other door. In FIG. 7A, the pivot axis 44 of the bottom door 26 is above the central axis 32 of the nacelle 20 while the pivot axis 40 of the upper door 24 is below the central axis 32. However, the pivot axis 40 of the upper door 24 is closer to the central axis 32 than the bottom door 26. Both pivoting axes lay in a common vertical plane.

Figure 7B:
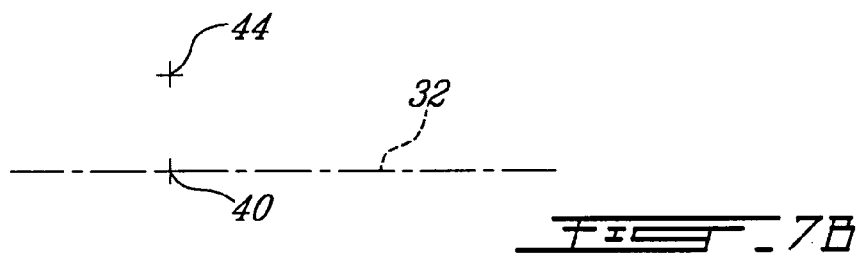
Figure 7C:
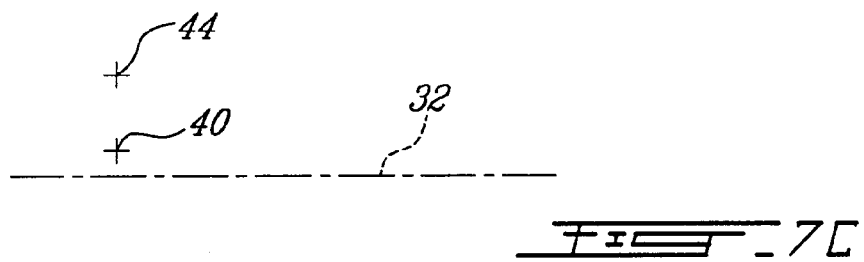

In FIG. 7B, the pivot axis 40 of the upper door 24 is in registry with the central axis 32. In FIG. 7C, the pivot axis 40 of the upper door 24 is above the central axis 32. Both pivoting axes lay in a common vertical plane.

Figure 7D:
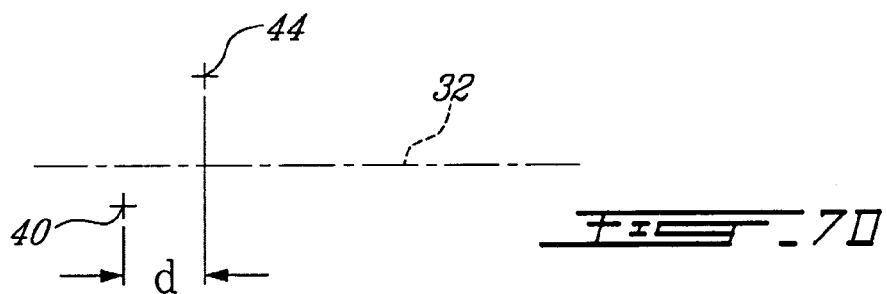
Figure 7E:
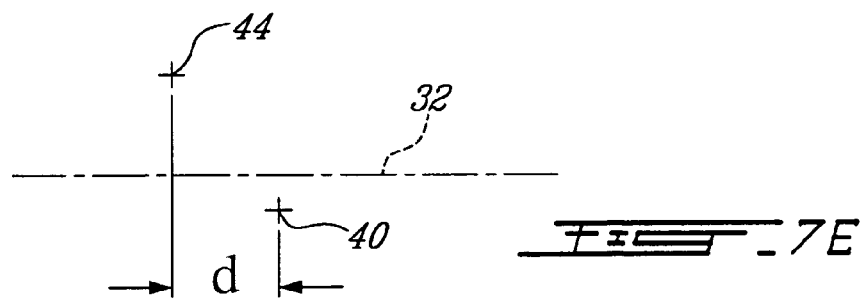

FIGS. 7D and 7E show variants that are applicable to either FIG. 7A, 7B or 7C. It shows that the pivot axis 44 of the bottom door 26 can be offset by a distance "d" that is either upstream or downstream with reference to the jet flow.

Figure 8A:
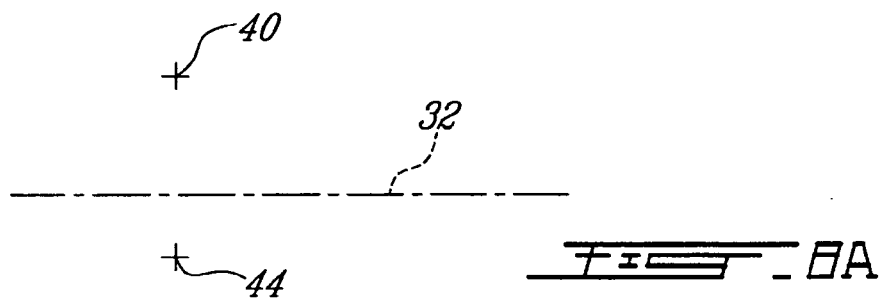
FIGS. 8A to 8E schematically show a variant of the different configurations for the pivot axes.
Figure 8B:
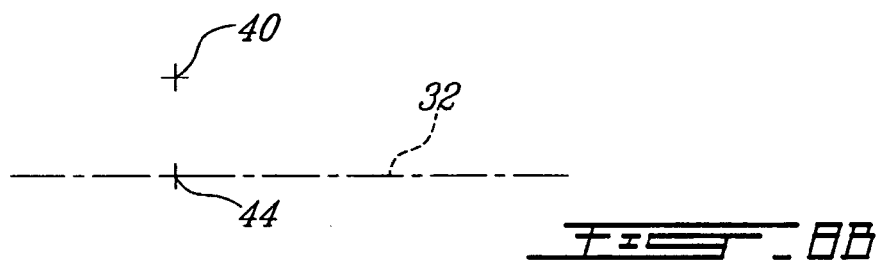
Figure 8C:
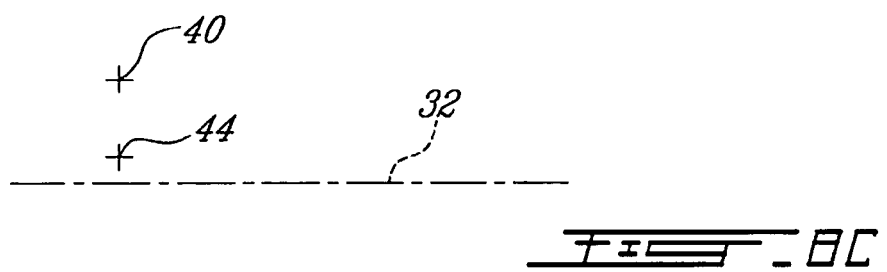

FIGS. 8A to 8E show alternative embodiments of the pivot axes. In these embodiments, the pivot axis 40 of the upper door 24 is above the central axis 32 while the pivot axis 44 of the bottom door 26 is slightly below the central axis 32. In FIG. 8B, the pivot axis 44 of the bottom door 26 is in registry with the central axis 32 of the nacelle 20. In FIG. 8C, the pivot axis 44 of the bottom door 26 is slightly above the central axis 32 of the nacelle 20. Both pivoting axes lay in a common vertical plane.

Figure 8D:
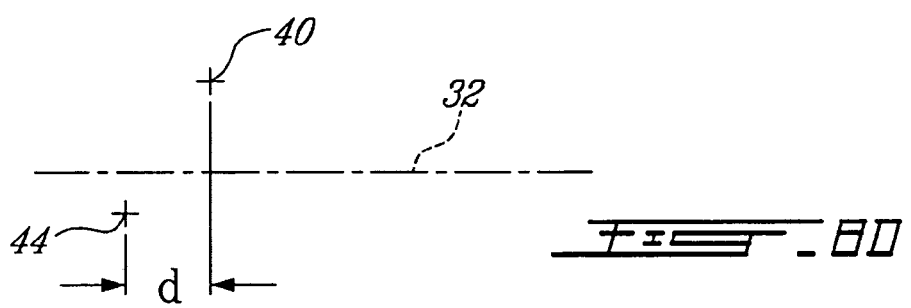
Figure 8E:
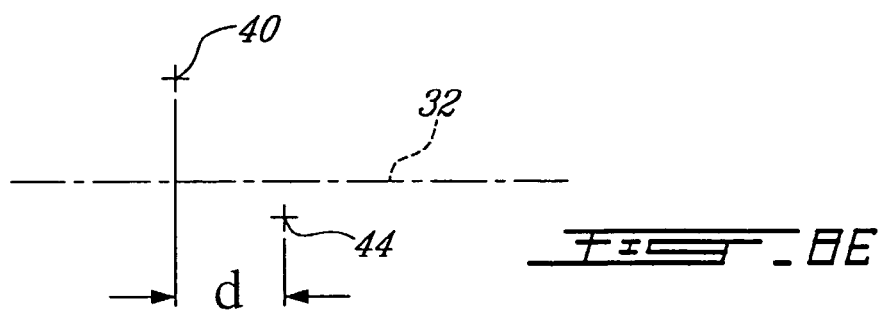

FIGS. 8D and 8E show the pivot axes being offset, either upstream or downstream. Again, this is applicable to either FIG. 8A, 8B or 8C.

Figure 9:
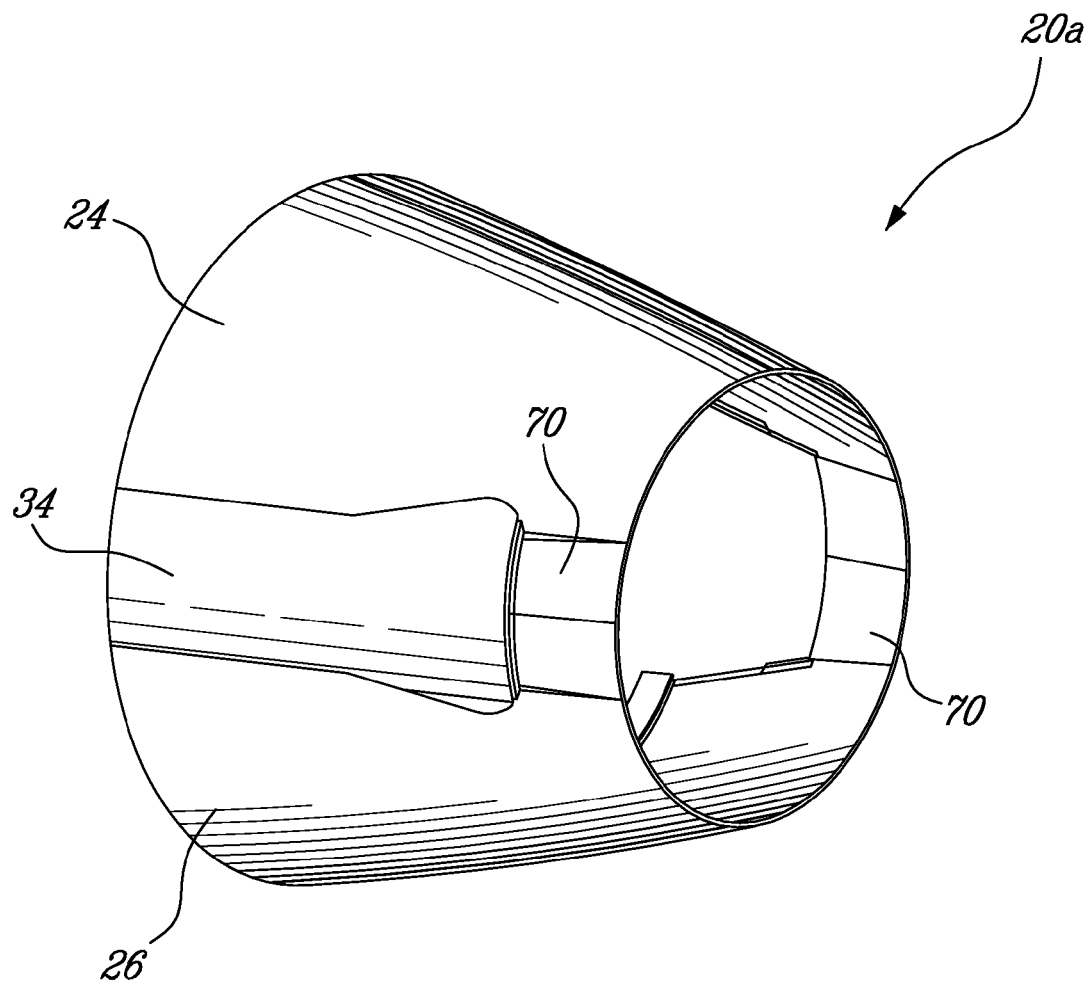
FIG. 9 shows another example of an improved thrust reverser nozzle, with the doors in their stowed position.

FIG. 9 shows a variant of the thrust reverser nozzle 22. In the illustrated embodiment, the fairing 34 is fixed. The flaps 70 form the rear portion of the jet pipe arms and of the continuation of the fairing 34. Each flap 70 is pivotable with reference to a vertical axis substantially located at the forward end of the flap. The flaps pivot inward the reverser nozzle when the reverser doors 24, 26 are moved from their stowed to their deployed position and come back to their stowed position when the reverser doors move from their deployed to their stowed position.

Figure 10:
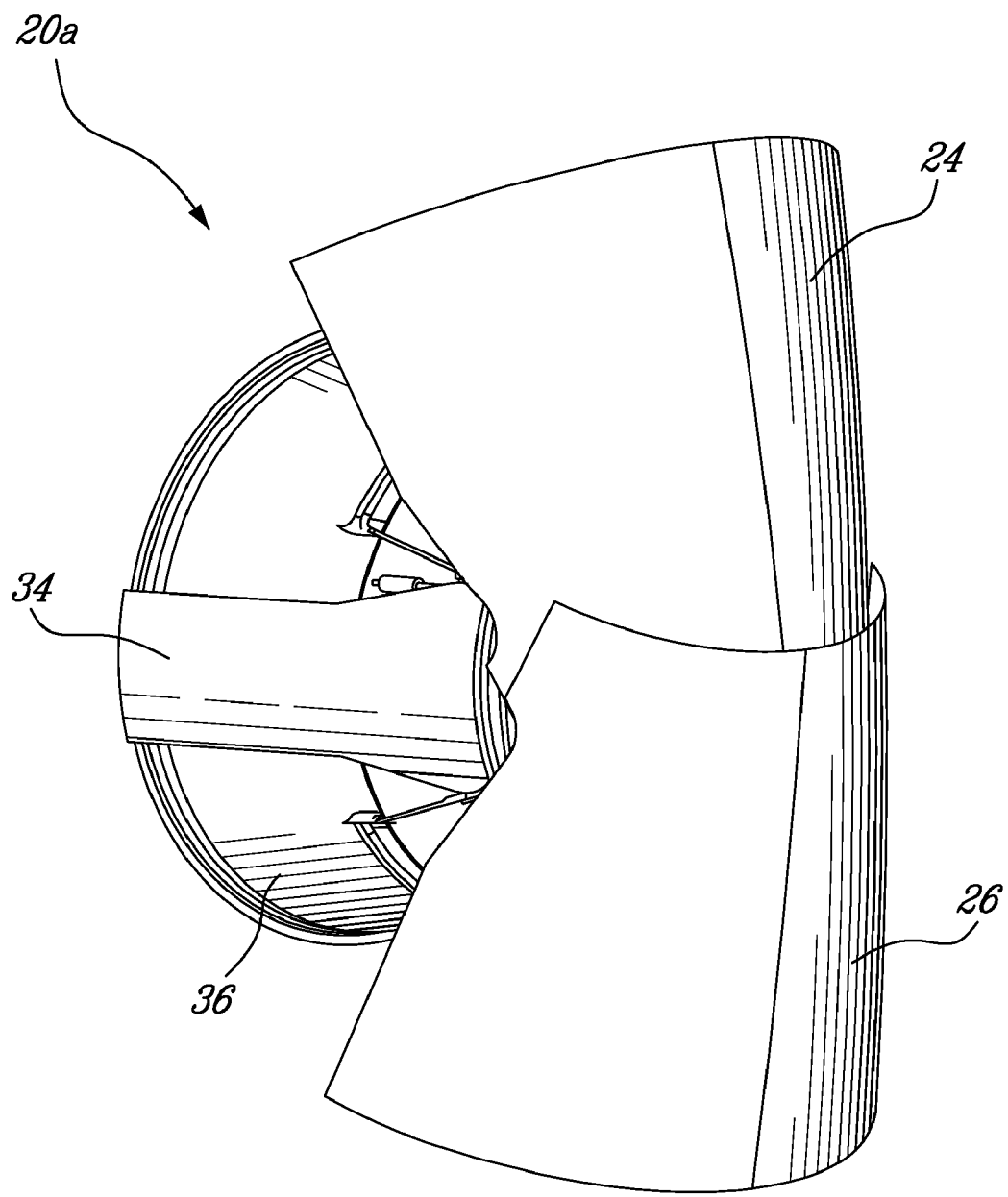
FIG. 10 is a perspective view showing the thrust reverser nozzle of FIG. 9 with the doors in their deployed position.

FIG. 10 shows the doors 24, 26 in their deployed position.

Figure 11:
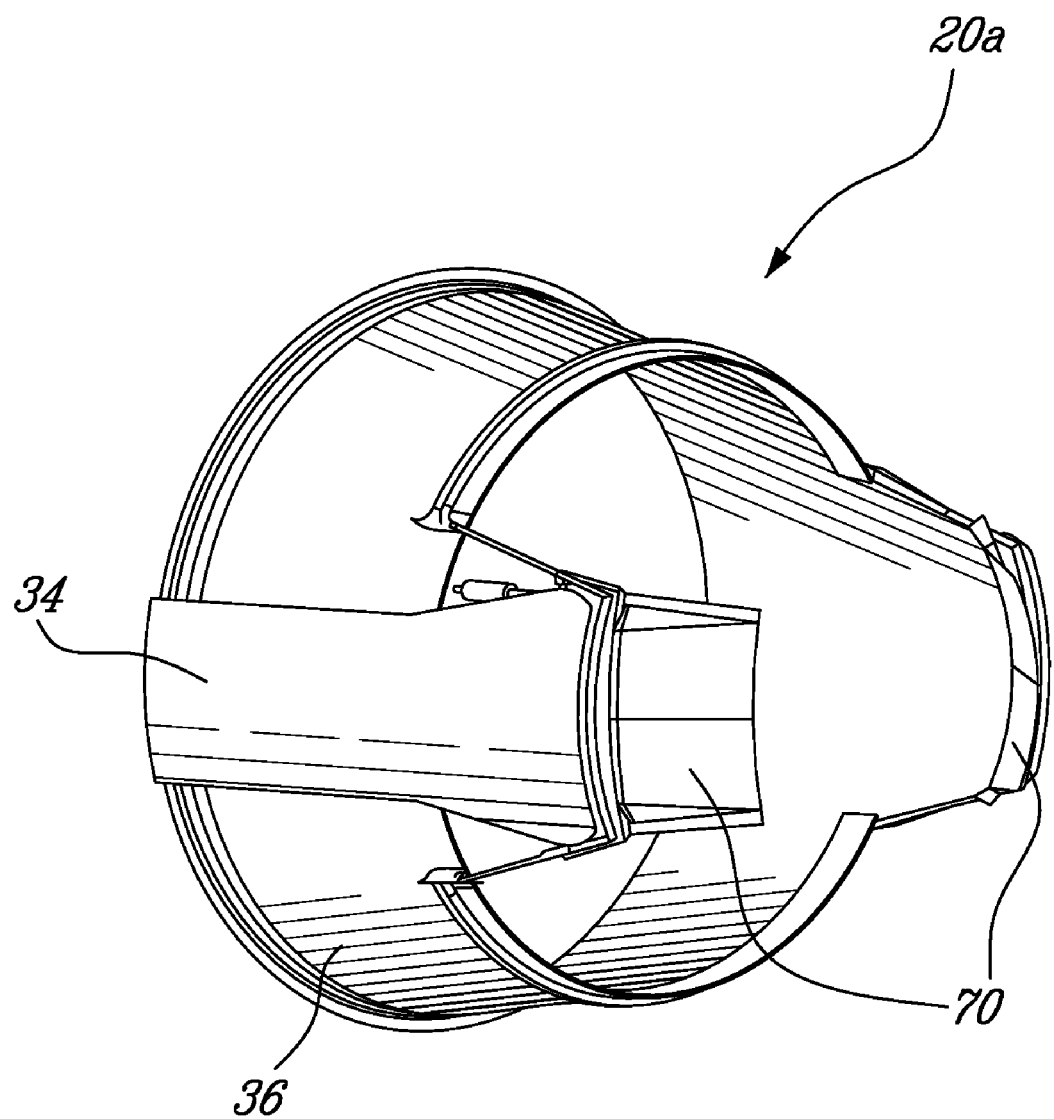
FIG. 11 is a view similar to FIG. 10, with the doors being removed.

FIG. 11 shows the deployed position of the thrust reverser nozzle 22, but without the doors. As can be appreciated, the flaps 70 were allowed to pivot slightly inwards so as to provide room for the sides of the doors and also to concentrate the jet towards the center when the thrust reverser nozzle 22 is deployed.

Overall, the thrust reverser nozzle 22 has many advantages, including being a simple and robust construction that is foremost capable of duplicating the forward thrust performance of a nacelle that is not fitted with a thrust reverser. This is made possible because the thrust reverser installation does not substantially change the nacelle key design parameters such as nacelle length, base area, mixing length, throat location, inner and outer flow surfaces. When in its deployed position, the thrust reverser nozzle 22 is also capable of providing a retarding force to the aircraft during landing.

The asymmetrical pivoted doors have many advantages. One is that the bottom door 26 can be pivoted more than the upper door 24. This can generate a net force pushing the aft section 20a of the nacelle 20 upwards, thereby creating a nose-down pitching moment to improve control of the aircraft on the ground.

The above description is meant to be exemplary only, and one skilled in the art will recognize that other changes may also be made to the embodiments described without departing from the scope of the invention disclosed as defined by the appended claims. For instance, the present invention is not limited to a thrust reverser nozzle with an upper door pivoting into the bottom door. One can design a reverser nozzle with the bottom door pivoting into the upper door. To achieve this, one needs to only permute the above described position of the pivoting axis of the doors with reference to the central axis of the reverser nozzle. The linkage arm can be different from what is shown in the drawings. For instance, both arms can be L-shaped. Although not desirable for a number of design and structural considerations, only one actuator can also be provided for the whole system. In this case, the actuator is located between the two reverser doors, as previously described. In an alternate embodiment, instead of placing the actuators between the two doors in a plane substantially horizontal and containing the reverser nozzle central axis (FIGS. 4, 5), a dedicated actuator per door can be installed in a substantially vertical plane that contains the reverser nozzle central axis. In this latter case, each actuator is located in the plane of symmetry of each door, and each actuator controls the position of their dedicated reverser door. One end of the actuator is pivotally mounted on the jet pipe while its other end, the piston rod is directly and pivotally mounted to the dedicated reverser door, thus eliminating the need of links 52 and 54 of FIGS. 4, 5. The thrust reverser nozzle of the invention can be considered for installation on new engines and nacelles as well as retrofits. Still other modifications which fall within the scope of the present invention will be apparent to those skilled in the art, in light of a review of this disclosure, and such modifications are intended to fall within the appended claims.

What is claimed is:

1. A thrust reverser nozzle for a nacelle of a turbofan gas turbine engine, the nacelle having a central axis and a propulsive jet outlet, the thrust reverser nozzle comprising a jet pipe terminating aft in a pair of side arms, a first reverser door and a second reverser door defining a portion of an aft section of the nacelle, the doors having a respective trailing edge adjacent to the propulsive jet outlet and being asymmetrically pivotally joined to said side arms about first and second pivot axes, respectively, for deployment between a stowed position and a radially outward deployed position, one of the doors having its pivot axis closer to the central axis of the nacelle than is the pivot axis of the other door.

2. The thrust reverser nozzle as defined in claim 1, wherein the doors are movable in a substantially vertical plane.

3. The thrust reverser nozzle as defined in claim 2, wherein the first reverser door is above the second reverser door in the stowed position.

4. The thrust reverser nozzle as defined in claim 1, wherein the trailing edges of the doors are coplanar with a plane substantially perpendicular to the center axis.

5. The thrust reverser nozzle as defined in claim 1, wherein the pivot axis of one of the doors intersects the central axis.

6. The thrust reverser nozzle as defined in claim 1, wherein the pivot axes of the doors are on the same side with reference to the central axis.

7. The thrust reverser nozzle as defined in claim 1, wherein the pivot axes of the doors are longitudinally in alignment with each other.

8. The thrust reverser nozzle as defined in claim 1, wherein the pivot axes of the doors are longitudinally offset with reference to each other.

9. The thrust reverser nozzle as defined in claim 1, wherein the first reverser door is closer to the engine in the deployed position than the second reverser door.

10. The thrust reverser nozzle as defined in claim 1, wherein the doors are separated by opposite longitudinally-disposed fairings, each fairing comprising an inwardly-biased portion pivotally mounted and outwardly movable when the doors are in their deployed position.

11. The thrust reverser nozzle as defined in claim 1, wherein the doors are connected to at least one actuator, the actuator having one end connected to a fixed structure and having another end connected to a linkage, the linkage having a first arm connected to the upper reverser door and a second arm connected to the lower reverser door.

12. The thrust reverser nozzle as defined in claim 11, wherein the first arm and the second arm of the at least one actuator have an unequal length.

13. The thrust reverser nozzle as defined in claim 1, wherein each door has an inner jet pipe portion complementary to said jet pipe to which the thrust reverser nozzle is mounted.

14. The thrust reverser nozzle as defined in claim 1, further comprising a pair of opposite outwardly-biased flaps adjacent to the propulsive jet outlet and between the doors, the flaps being inwardly pivoted in a substantially horizontal plane when the doors are in their deployed position to deflect gases from the engine towards the center of the propulsive jet outlet.

15. The thrust reverser nozzle as defined in claim 1, wherein each door is connected to one actuator substantially located in the plane of symmetry of the door, the actuator having one end pivotally connected to a fixed structure and having a piston rod directly connected to the door.

16. The thrust reverser nozzle as defined in claim 1, wherein each door is connected to its pivot axis by a linking are, each linking arm being connected to the corresponding door at a location upstream the corresponding pivot axis when the doors are in their stowed position.

17. The thrust reverser nozzle as defined in claim 1, wherein the first and second door pivot axes are disposed in a common plane which is perpendicular to the central axis.

18. The thrust reverser nozzle as defined in claim 1, wherein each pivot axis is closer to the other door than to the door to which the respective pivot is connected.

19. The thrust reverser nozzle as defined in claim 16, wherein one linking arm is shorter than the other.

20. The thrust reverser nozzle as defined in claim 19, wherein in the deployed position the trailing edge of one door is between the engine and the trailing edge of the other door.

21. The thrust reverser nozzle as defined in claim 1, wherein the first pivot axis of the first reverser door is the only pivot axis of the first reverser door and the second pivot axis of the second reverser door is the only pivot axis of the second reverser door.

22. The thrust reverser nozzle as defined in claim 1, wherein the doors are asymmetrically pivotal between said stowed position and said deployed position by motion consisting of respective rotation about single said pivot axes.

23. The thrust reverser nozzle as defined in claim 1, wherein the first pivot axis of the first reverser door is fixed and the second pivot axis of the second reverser door is fixed.

24. An aircraft engine thrust reverser comprising:
a jet pipe having a central axis and terminating aft in a pair of side arms;
first and second thrust reverser doors surrounding said jet pipe and asymmetrically joined to said side arms at first and second pivot axes, respectively;
said first and second doors terminating aft with said side arms in a common nozzle outlet in a stowed position; and
one of said first and second pivot axes being radially closer to said central axis to permit radially outward deployment of said first and second doors about said first and second pivot axes, with one door pivoting asymmetrically aft into the other door.

25. A reverser according to claim 24 wherein said first and second doors and side arms have corresponding trailing edges collectively defining a planar nozzle outlet in said stowed position.

26. A reverser according to claim 25 wherein said first door is joined to said first pivot axis by a first hinge arm, and said second door is joined to said second pivot axis by a second hinge arm, and both hinge arms are affixed to their respective door upstream from said pivot axes in said stowed position.

27. A reverser according to claim 26 wherein:
said jet pipe includes opposite recesses extending aft between said side arms; and
said first and second doors include corresponding jet pipe portions attached therein and complementing said jet pipe recesses to collectively obtain a substantially complete exhaust nozzle terminating at said nozzle outlet when said doors are stowed.

28. A reverser according to claim 27 wherein said first and second doors and jet pipe converge aft with decreasing diameter in said stowed position, with the radially outer surfaces of said doors defining corresponding portions of an external nacelle, and said jet pipe portions adjoin said jet pipe to collectively define said exhaust nozzle for efficiently discharging exhaust from said aircraft engine.

29. A reverser according to claim 27 wherein one of said first and second hinge arms is shorter than the other hinge arm to effect said deployment of said doors.

30. A reverser according to claim 27 wherein said first and second hinge arms have different configurations, with one hinge arm being longitudinally curved and the other being longitudinally straight.

31. A reverser according to claim 27 further comprising a common linear actuator joined to said first and second doors by corresponding links having different lengths to effect said deployment of said doors.

32. A reverser according to claim 27 wherein said first hinge arm extends forwardly upstream from said first pivot axis to said first door in said stowed position, and extends oppositely aft from said first pivot axis to said first door in a deployed position of said first door.

33. A reverser according to claim 27 wherein said second hinge arm extends forwardly upstream from said second pivot axis to said second door in said stowed position, and extends oppositely aft from said second pivot axis to said second door in a deployed position of said second door.

34. A reverser according to claim 27 wherein said first and second pivot axes are disposed in a common vertical plane at different radial distances from said central axis, and said first and second doors are disposed on opposite vertical sides of said central axis.

35. A reverser according to claim 34 wherein said first pivot axis is disposed radially between said second pivot axis and said second door.

36. A reverser according to claim 34 wherein said second pivot axis is disposed radially between said first pivot axis and said second door.

37. A reverser according to claim 34 wherein one of said first and second pivot axes is coplanar with said central axis.

38. A reverser according to claim 34 wherein said first and second pivot axes are respectively disposed on said opposite sides of said central axis.

39. A reverser according to claim 34 wherein both of said first and second pivot axes are disposed on the same vertical side of said central axis.

40. A reverser according to claim 34 wherein said first door and said second pivot axis are disposed vertically above said central axis on the same side thereof.

41. A reverser according to claim 34 wherein said first door and said first pivot axis are disposed vertically above said central axis on the same side thereof.

42. A reverser according to claim 34 wherein said first and second pivot axes are disposed on said opposite sides of said central axis closer to said second and first doors than to said first and second doors, respectively.

43. A reverser according to claim 34 wherein said first and second hinge arms extend upstream from said first and second pivot axes to said first and second doors, respectively, and cross each other longitudinally in said stowed position.

44. A reverser according to claim 27 wherein said first and second pivot axes are axially offset from each other along said central axis.

45. A reverser according to claim 44 wherein said second pivot axis is disposed aft of said first pivot axis.

46. A reverser according to claim 44 wherein said second pivot axis is disposed forward of said first pivot axis.

47. A reverser according to claim 44 wherein said first pivot axis is disposed radially below said central axis adjacent said second door, and said second pivot axis is disposed radially above said central axis adjacent said first door.

48. A reverser according to claim 44 wherein said first pivot axis is disposed radially above said central axis adjacent said first door, and said second pivot axis is disposed radially below said central axis adjacent said second door.

* * * * *